US006337118B1

(12) United States Patent
Takehana et al.

(10) Patent No.: US 6,337,118 B1
(45) Date of Patent: Jan. 8, 2002

(54) ADHESIVE FOR OPTICAL DISKS

(75) Inventors: Yuichi Takehana, Umezono (JP); Toshihiko Takahashi, Woluwe-Saint-Lambert (BE); Takashi Ukachi, Kamiya (JP)

(73) Assignees: JSR Corporation; Japan Fine Coatings Co., Ltd., both of Tokyo (JP)

( * ) Notice: Subject to any disclaimer, the term of this patent is extended or adjusted under 35 U.S.C. 154(b) by 0 days.

(21) Appl. No.: 09/357,276

(22) Filed: Jul. 20, 1999

(30) Foreign Application Priority Data

Aug. 20, 1998 (JP) ............................... 10-233997

(51) Int. Cl.$^7$ .................................. B32B 3/02
(52) U.S. Cl. .................... 428/64.1; 428/64.4; 428/65.2; 428/913; 430/270.11; 430/945
(58) Field of Search ............................ 428/64.1, 64.2, 428/64.4, 65.2, 913; 430/270.11, 495.1, 945; 369/288; 522/96, 97, 182

(56) References Cited

U.S. PATENT DOCUMENTS

| 4,686,543 A | 8/1987 | Tani |
| 4,731,620 A | 3/1988 | Yabe |
| 4,738,870 A | 4/1988 | Green et al. ................ 427/54.1 |
| 6,086,795 A | * 7/2000 | Hatton ....................... 252/582 |

FOREIGN PATENT DOCUMENTS

| DE | 3642961 | 6/1987 |
| EP | 0 768 353 A1 | 4/1997 |
| EP | 0 835 917 A1 | 4/1998 |
| JP | 60185234 A | 9/1985 |
| JP | 60226037 A | 11/1985 |
| JP | 61059646 A | 3/1986 |
| JP | 61139954 A | 6/1986 |
| JP | 62006449 | 1/1987 |
| JP | 63160034 A | 7/1988 |
| JP | 01066841 A | 3/1989 |
| JP | 01119936 A | 5/1989 |
| JP | 02103748 A | 4/1990 |
| JP | 02103749 A | 4/1990 |
| JP | 02103750 A | 4/1990 |
| JP | 04202581 A | 7/1992 |
| JP | 10046109 A | 2/1998 |
| RU | 2057092 | 3/1996 |
| RU | 2059669 | 5/1996 |
| WO | WO9634065 | 10/1996 |
| WO | WO9740115 | 10/1997 |

\* cited by examiner

*Primary Examiner*—Elizabeth Evans
(74) *Attorney, Agent, or Firm*—Leydig, Voit & Mayer, Ltd.

(57) ABSTRACT

The invention relates to an adhesive for optical disks exhibiting superior adhesive properties with resins such as polycarbonate or metals such as aluminum and gold, and possessing better wet heat resistance than conventional adhesives. The adhesive comprises (A) a urethane (meth) acrylate oligomer (B) a hydroxy (meth)acrylate in which the hydroxy group is 3 or more carbons spaced away from the (meth) acrylate, and (C) at least one photoinitiator.

50 Claims, No Drawings

ADHESIVE FOR OPTICAL DISKS

FIELD OF THE INVENTION

The present invention relates to a photocurable adhesive for optical disks, and to optical disks made therewith.

BACKGROUND OF THE INVENTION

Recent progress of information technologies including computer devices, computer software, and communication technologies has allowed a high speed conveyance of mass information. Along with this advancement, recording media which can record much more information at high density have been desired and the development of such recording media is ongoing. An example of such high-density recording media is a DVD (digital video disk or digital versatile disk) which has been developed as a recording media for wide use in the next generation. The DVD differs from conventional CDs (compact disks) in that the DVD is manufactured by laminating two disks. Therefore, an adhesive for laminating these two disks is required. Hot-melt, heat-curable, anaerobic curable, and similar adhesives have been tried for laminating disks for DVD, but these adhesives have not been entirely successful. Hot-melt adhesives have insufficient heat stability and weatherability. Because the hot-melt adhesives soften at high temperature, the decreased adhesive strength causes the laminated disks to separate and deform. In addition, since transparency of the adhesive is insufficient, it is difficult to use hot-melt adhesives for the DVD with a two-layered structure comprising a translucent recording film. Heat-curable adhesives are unsatisfactory because heat curing causes the substrate for forming a disk to deform, and the curing time is long. Anaerobic curable adhesives are also unsatisfactory because they require a certain period of time for curing, thereby resulting in reduced productivity.

Photocurable adhesives have been proposed to solve these problems. For example, UV curable adhesives comprising a urethane acrylate as a major component has been disclosed in Japanese Patent Applications Laid-open No. 142545/1986 and No. 89462/1994.

However, UV curable adhesives known heretofore have also been unsatisfactory. Conventional UV curable adhesives do not provide sufficient adhesion to resins such as a polycarbonate for forming the disks, aluminum for forming reflecting films, gold for forming translucent films, and the like, while producing cured products with sufficient moisture resistance.

SUMMARY OF THE INVENTION

An object of the present invention therefore is to provide a UV curable adhesive which exhibits superior adhesion to resins, such as polycarbonate for forming the disks, aluminum for forming reflecting films, gold for forming translucent films, and the like. A related object is to provide a UV curable adhesive that can produce cured products with excellent moisture resistance, in particular at relatively high temperatures.

These and other objects and advantages of the invention will be readily understood by those skilled in the art in view of the detailed description of the preferred embodiment of the invention.

DETAILED DESCRIPTION OF THE PREFERRED EMBODIMENTS OF THE INVENTION

As a result of extensive studies, the inventors of the present invention have discovered that the above problems can be solved by the following adhesive for optical disks.

Specifically, in accordance with the present invention a photocurable adhesive for optical disks comprises the following components (A), (B), and (C):

(A) a urethane acrylate or methacrylate, referred to herein as (meth)acrylate comprising a backbone, urethane groups, and a (meth)acrylate group.

(B) a hydroxyalkyl (meth)acrylate, in which the hydroxyl group and the (meth)acrylate group are spaced apart by at least three (3) carbon atoms, and (C) at least one photoinitiator. The adhesive composition of the present invention can also include at least one (meth)acrylate functional diluent (D) other than (B), and/or at least one non-(meth)acrylate functional diluent (E), as described more fully herein.

The urethane(meth)acrylate used as the component (A) is generally obtained by reacting a polyol, a polyisocyanate, and a hydroxyl group-containing (meth) acrylate.

The polyol that can be used to form the urethane (meth) acrylate can be a diol or a polyol. By way of illustration and not in limitation, the polyol can be a polyether polyol, polyester polyol, polycarbonate polyol, polycaprolactone polyol, an aliphatic hydrocarbon containing two or more hydroxyl groups in the molecule, alicyclic hydrocarbon containing two or more hydroxyl groups in the molecule, unsaturated hydrocarbon containing two or more hydroxyl groups in the molecule, and the like. The polyols can be used either independently or in combinations of two or more.

The above polyether polyol includes aliphatic polyether polyols, alicyclic polyether polyols and aromatic polyether polyols.

Examples of aliphatic polyether polyols include polyhydric alcohols such as polyethylene glycol, polypropylene glycol, polytetramethylene glycol, polyhexamethylene glycol, polyheptamethylene glycol, polydecamethylene glycol, pentaerythritol, dipentaerythritol, trimethylolpropane, alkylene oxide addition polyols such as ethylene oxide addition triol of trimethylolpropane, propylene oxide addition triol of trimethylolpropane, ethylene oxide and propylene oxide addition triol of trimethylolpropane, ethylene oxide addition tetraol of pentaerythritol, ethylene oxide addition hexaol of dipentaerythritol, polyether polyols produced by ring-opening polymerization of two or more ionic polymerizable cyclic compounds, and the like.

Examples of the ionic polymerizable cyclic compounds include cyclic ethers such as ethylene oxide, propylene oxide, butene-1-oxide, isobutene oxide, 3,3-bischloromethyl oxetane, tetrahydrofuran, 2-methyltetrahydrofuran, dioxane, trioxane, tetraoxane, cyclohexene oxide, styrene oxide, epichlorohydrin, glycidyl ether, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, and glycidyl benzoate. Examples of specific combinations of two or more of the above ionic polymerizable cyclic compounds include combinations of tetrahydrofuran and ethylene oxide, tetrahydrofuran and propylene oxide, tetrahydrofuran and 2-methyltetrahydrofuran, tetrahydrofuran and 3-methyltetrahydrofuran, ethylene oxide and propylene oxide, butene-1-oxide and ethylene oxide, and tetrahydrofuran, butene-1-oxide, and ethylene oxide.

A polyether polyol produced by ring-opening polymerization of one of the above ionic polymerizable cyclic compounds and cyclic imines such as ethyleneimine, cyclic lactic acids such as β-propyolactone and glycolic acid, or dimethylcyclopolysiloxane can also be used.

Examples of the alicyclic polyether polyols include alkylene oxide addition diol of hydrogenated bisphenol A, alkylene oxide addition diol of hydrogenated bisphenol F, and alkylene oxide addition diol of 1,4-cyclohexanediol.

Examples of the aromatic polyether polyols include alkylene oxide addition diol of bisphenol A, alkylene oxide addition diol of bisphenol F, alkylene oxide addition diol of hydroquinone, alkylene oxide addition diol of naphthohydroquinone, and alkylene oxide addition diol of anthrahydroquinone.

Polyether polyols are commercially available under the following trade names: examples of aliphatic polyether polyols include PTMG650, PTMG1000, PTMG2000 (manufactured by Mitsubishi Chemical Corp.), PPG1000, EXCENOL1020, EXCENOL2020, EXCENOL3020, EXCENOL4020 (manufactured by Asahi Glass Co., Ltd.), PEG1000, Unisafe DC1100, Unisafe DC1800, Unisafe DCB1100, Unisafe DCB1800 (manufactured by Nippon Oil and Fats Co., Ltd.), PPTG1000, PPTG2000, PPTG4000, PTG400, PTG650, PTG2000, PTG3000, PTGL1000, PTGL2000 (manufactured by Hodogaya Chemical Co., Ltd.), Z-3001-4, Z-3001-5, PBG2000, PBG2000B (manufactured by Daiichi Kogyo Seiyaku Co., Ltd.), TMP30, PNT4 Glycol, EDA P4, EDA P8 (manufactured by Nippon Nyukazai Co., Ltd.), and Quadrol (manufactured by Asahi Denka Kogyo K.K.); and examples of aromatic polyether polyols include Uniol DA400, DA700, DA1000, and DB400 (manufactured by Nippon Oil and Fats Co., Ltd.).

The polyester polyol can be obtained by reacting a polyhydric alcohol with a polybasic acid. Examples of a polyhydric alcohol include ethylene glycol, polyethylene glycol, propylene glycol, polypropylene glycol, tetramethylene glycol, polytetramethylene glycol, 1,4-butanediol, 1,5-pentanediol, 1,6-hexanediol, 1,7-heptanediol, 1,8-octanediol, neopentyl glycol, 1,4-cyclohexanediol, 1,4-cyclohexane dimethanol, 1,2-bis(hydroxyethyl)cyclohexane, 2,2-diethyl-1,3-propanediol, 3-methyl-1,5-pentanediol, 1,9-nonanediol, 2-methyl-1,8-octanediol, glycerol, trimethylolpropane, ethylene oxide addition compound of trimethylolpropane, propylene oxide addition compound of trimethylolpropane, ethylene oxide and propylene oxide addition compound of trimethylolpropane, sorbitol, pentaerythritol, dipentaerythritol, and alkylene oxide addition polyols. Examples of polybasic acids include phthalic acid, isophthalic acid, terephthalic acid, maleic acid, fumaric acid, adipic acid, sebacic acid, and the like. Commercially available products of these polyester polyols, such as Kurapol P1010, Kurapol P2010, PMIPA, PKA-A, PKA-A2, PNA-2000 (manufactured by Kuraray Co., Ltd.), and the like can be used.

Moreover, examples of the polycarbonate polyols are polycarbonate diols shown by the formula:

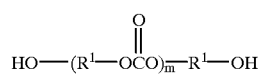

(1)

wherein $R^1$ represents an alkylene group having 2–20 carbon atoms, a residual group of (poly)ethylene glycol, a residual group of (poly)propylene glycol, or a residual group of (poly)tetramethylene glycol, and m is an integer from 1 to 30.

Specific examples of $R^1$ are a residual group excluding both terminal hydroxyl groups from 1,4-butanediol, 1,5-pentanediol, neopentyl glycol, 1,6-hexanediol, 1,4-cyclohexanedimethanol, 1,7-heptanediol, 1,8-octanediol, 1,9-nonanediol, ethylene glycol, diethylene glycol, triethylene glycol, tetraethylene glycol, propylene glycol, dipropylene glycol, tripropylene glycol, tetrapropylene glycol, and the like.

Polycarbonate polyols are commercially available under the trade names, for example, DN-980, DN-981, DN-982, DN-983 (manufactured by Nippon Polyurethane Industry Co., Ltd.), PC-8000 (manufactured by PPG), PNOC1000, PNOC2000, PMC100, PMC2000 (manufactured by Kuraray Co., Ltd.), PLACCEL CD-205, CD-208, CD-210, CD-220, CD-205PL, CD-208PL, CD-210PL, CD-220PL, CD-205HL, CD-208HL, CD-210HL, CD-220HL, CD-210T, CD-221T (manufactured by Daicel Chemical Industries, Ltd.), and the like.

Examples of polycaprolactone polyols include polycaprolactone diols obtained by the addition reaction of ε-caprolactone to a diol such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, and 1,4-butanediol. Polycaprolactone polyols are commercially available under the trade names, for example, PLACCEL 205, 205AL, 212, 212AL, 220, 220AL (manufactured by Daicel Chemical Industries, Ltd.) and the like.

Examples of aliphatic hydrocarbons containing two or more hydroxyl groups in the molecule include ethylene glycol, propylene glycol, tetramethylene glycol, 1,4-butanediol, 1,5-pentanediol, 1,6-hexanediol, 1,7-heptanediol, 1,8-octanediol, 1,9-nonanediol, neopentyl glycol, 2,2-diethyl-1,3-propanediol, 3-methyl-1,5-pentanediol, 2-methyl-1,8-octanediol, hydrogenated polybutadiene with terminal hydroxyl groups, glycerol, trimethylolpropane, pentaerythritol, and sorbitol.

Examples of alicyclic hydrocarbons having two or more hydroxyl groups in the molecule include 1,4-cyclohexanediol, 1,4-cyclohexanedimethanol, 1,2-bis(hydroxyethyl)cyclohexane, dimethylol compounds of dicyclopentadiene, and tricyclodecanedimethanol.

Examples of unsaturated hydrocarbons containing two or more hydroxyl groups in the molecule include, a polybutadiene with terminal hydroxyl groups, a polyisoprene with terminal hydroxyl groups, and the like.

Furthermore, examples of polyols other than the above-mentioned polyol compounds include β-methyl-δ-valerolactone diol, castor oil-modified diol, a polydimethylsiloxane with diols at the terminals, and a polydimethylsiloxane carbitol-modified diol.

The number average molecular weight of the polyols is preferably from 50 to 15000, and more preferably from 100 to 8000.

The polyisocyanate is preferably a diisocyanate. Examples of diisocyanate compounds include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, 2,2,4-trimethylhexamethylene diisocyanate, bis(2-isocyanate ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, and tetramethylxylylene diisocyanate. Among these, 2,4-tolylene diisocyanate, 2,6-tolylene diisocyanate, hydrogenated xylylene diisocyanate, isophorone diisocyanate, hydrogenated diphenylmethane diisocyanate, and the like are preferable. These diisocyanate compounds may be used either singly or in combinations of two or more.

The hydroxyl group-containing (meth)acrylate compound is a (meth)acrylate compound in which the ester group includes a hydroxyl substituent. Examples of such a compound are 2-hydroxyethyl(meth)acrylate, 3-hydroxypropyl (meth)acrylate, 4-hydroxybutyl(meth)acrylate, 2-hydroxy-3-phenyloxypropyl(meth)acrylate, 1,4-butanediol mono (meth)acrylate, 2-hydroxyalkyl(meth)acryloyl phosphate, 4-hydroxy-cyclohexyl(meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate. Additional examples of such hydroxyl group-containing (meth)acrylates are compounds represented by the following structural formula (2):

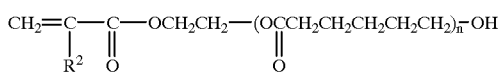

(2)

wherein $R^2$ represents a hydrogen atom or a methyl group and n denotes an integer from 1 to 15, and preferably from 1 to 4.

Compounds obtained by the addition reaction of a (meth) acrylic acid and a compound containing a glycidyl group such as alkyl glycidyl ether, allyl glycidyl ether, and glycidyl (meth)acrylate can also be given as examples of the (meth) acrylate compound. Among these compounds, 2-hydroxyalkylacrylates such as for example 2-hydroxyethyl(meth)acrylate, and 2-hydroxypropylacrylate are preferred. 2-hydroxyethylacrylate is most preferred.

There are no specific limitations to the process for synthesizing the urethane (meth)acrylate (A). For instance, synthesis of the urethane (meth)acrylate (A) can be carried out according to the following processes (i) to (iii):

(i) A process for reacting the polyisocyanate compound (b) with the hydroxyl group-containing (meth)acrylate compound (c), and reacting the resulting product with the polyol compound (a);

(ii) a process for reacting the polyol compound (a), the polyisocyanate compound (b), and the hydroxyl group-containing (meth)acrylate compound (c) altogether; and (iii) a process for reacting the polyol compound (a) with the polyisocyanate compound (b), and reacting the resulting product with the hydroxyl group-containing (meth)acrylate compound.

In the synthesis of the urethane (meth)acrylate (A) used in the present invention, it is preferable to use a urethanization catalyst such as copper naphthanate, cobalt naphthanate, zinc naphthanate, di-n-butyltin dilaurate, triethylamine, 1,4-diazabicyclo[2.2.2]octane, and 1,4-diaza-2-methylbicyclo [2.2.2]octane. The catalyst can be used in an amount of from 0.01 to 1 part by weight for 100 parts by weight of the total reaction components. The reaction is generally performed at a temperature of 0 to 90° C., and preferably 10 to 80° C.

The number average molecular weight of the urethane (meth)acrylate used in the present invention is preferably from 400 to 20000, and more preferably from 600 to 10000.

To ensure superior adhesion to substrates and adequate viscosity, the urethane (meth)acrylate (A) is incorporated in the composition of the present invention in an amount preferably from 5 to 85 parts by weight, more preferably from 15 to 65 parts by weight, and most preferably from 15 to 55 parts by weight, for 100 parts by weight of the total amount of the components (A), (B), (C), (D) and (E).

The component (B) used in the present invention is a hydroxy(meth)acrylate in which there are at least 3 carbon atoms between the hydroxyl group and the acrylate residue. Preferably, component (B) is an hydroxyalkyl(meth)acrylate in which the hydroxy group is present on the γ, δ or ε position with respect to the acrylate; the δ position is most preferred. Suitable compounds include 3-hydroxypropyl (meth)acrylate, 4-hydroxybutyl (meth)acrylate, 4-hydroxycyclohexyl(meth) acrylate, 1,6-hexanediol mono (meth) acrylate, neopentyl glycol mono(meth)acrylate, trimethylohpropane di(meth) acrylate, trimethylolethane di(meth) acrylate, pentaerythritol tri(meth) acrylate, dipentaerythritol penta(meth)acrylate. Additional examples of (meth)acrylates suitable for use in the present invention are compounds represented by the following structural formula (2):

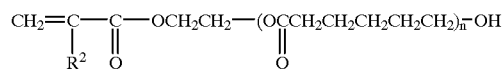

(2)

wherein $R^2$ represents a hydrogen atom or a methyl group and n denotes an integer from 1 to 15, and preferably from 1 to 4, and by the following structural formula 2 (a):

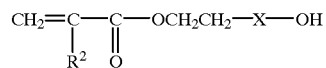

(2a)

wherein $R^2$ represents a hydrogen atom or a methyl group, and

X is a $C_2$–$C_{24}$ alkenyl, a $C_2$–$C_{24}$ alkynyl, an alkyl carbonate, an alkyl urethane, an alkyl urea, an alkyl amido, or an alkyl ether.

It will be appreciated by those skilled in the art that the selection of X is such that the hydroxyl group and the acrylate residue are spaced apart by at least 3 carbon atoms. While the hydroxyl group in Formula 2, and in Formula 2(a) above, is shown in the terminal position of the molecule, it need not be. The hydroxyl group may be in any position in the X linking group provided the hydroxyl group is separated from the (meth)acrylate moiety by 3 or more carbon atoms.

Compound B may also be a hydroxyarylacrylate wherein the aryl group may be unsubstituted or substituted. In keeping with the invention, the hydroxyl group may be on the aromatic ring, or it may be on a substituent of a substituted aromatic ring. The hydroxyl group is preferably spaced apart from the (meth)acrylate group by 3 or more carbon atoms.

Preferably, the molecular weight of the compound (B) molecule is 300 or less, more preferably less than 200. Of the above compounds, 4-hydroxybutyl (meth)acrylate is particularly preferred, and is commercially available from Osaka Organic Chemical Industry Co., Ltd, or from Mitsubishi.

The hydroxy(meth)acrylate, component (B), is preferably included in the composition of the present invention in an amount from 0.5 to 90 parts by weight, more preferably from 5 to 50 parts by weight and most preferably from 10 to 30 parts by weight, for 100 parts by weight of the total amount of the components (A), (B), (C), (D) and (E).

Compounds categorized under D or E can have hydroxyl groups as well. It is preferred to obtain an optimal adhesion to polycarbonate, in particular a good wet adhesion with compositions that before cure have a viscosity of about 1000 mpa.s or less, that a compound (B) is present, and that the amount of free hydroxyl groups in the composition is 0.3 meq/g or more, preferably, 0.5 meq/g or more, and in particular 0.8 meq/g or more. Generally, suitable adhesion is obtained with 4 meq/g or less, preferably with 3 meq/g or less.

The photo-polymerization initiator used as component (C) is preferably at least one of 2,2-dimethoxy-1,2-diphenylethan-1-one, 2-hydroxy-2-methyl-1-phenyl-propan-1-one, and 1-hydroxy-cyclohexyl phenyl ketone. Of these, 2,2-dimethoxy-1,2-diphenylethan-1-one and 2-hydroxy-2-methyl-1-phenyl-propan-1-one are particularly preferred. To ensure excellent wet heat resistance and curability of the composition, the component (C) is used in an amount preferably from 0.1 to 20 parts by weight, more preferably from 0.5 to 15 parts by weight, and even more preferably from 1 to 10 parts by weight, for 100 parts by weight of the total amount of the components (A), (B), (C), (D) and (E).

Commercially available products which can be used as the photo-polymerization initiator for the component (C), include IRGACURE 184, IRGACURE 500, IRGACURE 651, DAROCUR 1173, DAROCUR 4265 (manufactured by Ciba Specialty Chemicals Co., Ltd.), and the like.

A photo-polymerization initiator other than the preferred initiators described above may be used in the composition of the present invention as a component (C) alone or in combination. Examples of other photo-polymerization initiators are 3-methylacetophenone, 2,2-dimethoxy-2-phenylacetophenone, xanthone, fluorenone, benzaldehyde, fluorene, anthraquinone, triphenylamine, carbazole, 3-methylacetophenone, benzophenone, 4-chlorobenzophenone, 4,4'-dimethoxybenzophenone, 4,4'-diaminobenzophenone, benzoin ethyl ether, benzoin propyl ether, Michler's ketone, benzyl methyl ketal, 1-(4-isopropylphenyl)-2-hydroxy-2-methylpropan-1-one, 1-(4-dodecylphenyl)-2-hydroxy-2-methylpropan-1-one, 4-(2-hydroxyethoxy)phenyl-(2-hydroxy-2-propyl) ketone, 2-methyl-i-[4-(methylthio)phenyl]-2-morpholino-propan-1-one, 2,4,6-trimethylbenzoylphenyl phosphinate, 2,4,6-trimethylbenzoyldiphenylphosphine oxide, 2-benzyl-2-dimethylamino-1-(4-morpholinophenyl)-butan-1-one, bis(2,6-dimethoxybenzoyl)-2,4,4-trimethylpentylphosphine oxide, methylbenzoyl formate, thioxanethone, diethylthioxanthone, 2-isopropylthioxanthone, 2-chlorothioxanthone, and oligo[2-hydroxy-2-methyl-1-[4-(1-methylvinyl)phenyl]propanone].

These photo-polymerization initiators are commercially available under the trade names, for example, IRGACURE 261, 369, 907, CGI-403, 819, 1700, 1800, 1850 (manufactured by Ciba Specialty Chemicals Co., Ltd.), Lucirin TPO, LR8728, LR8893 (manufactured by BASF), Darocur 953, 1116, 1664, 2273, 2959, ZL1 3331 (manufactured by Ciba Specialty Chemicals Co., Ltd.), Ubecryl P36 (manufactured by UCB Co.), VICURE55 (manufactured by Akzo), ESACURE KIP100F, KIP150 (manufactured by Lamberti), and KAYACURE ITX, QTX, DETX, BMS (manufactured by Nippon Kayaku Co., Ltd.). The second group of photoinitiators can be added to the first group to improve surface curability and increase the curing rate of the composition. A preferable combined use of the second group of photoinitiators is to replace up to 70% of the initiator from the first group.

In addition to the above-described components (A), (B), and (C), a (meth)acrylate compound containing at least one (meth)acryloyl group in the molecule, excluding the compounds used as the component (B), can be added to the composition of the present invention as a component (D). Either a monofunctional compound having one (meth) acryloyl group or a polyfunctional compound having two or more (meth)acryloyl groups, or in appropriately proportioned combinations can be used as the component (D).

Examples of monofunctional monomers in the composition as component D include methyl (meth)acrylate, ethyl (meth)acrylate, propyl (meth)acrylate, isopropyl (meth) acrylate, butyl (meth)acrylate, amyl (meth)acrylate, isobutyl (meth)acrylate, t-butyl (meth)acrylate, pentyl (meth) acrylate, isoamyl (meth)acrylate, hexyl (meth)acrylate, heptyl (meth)acrylate, octyl (meth)acrylate, iso-octyl (meth) acrylate, 2-ethylhexyl (meth)acrylate, nonyl (meth)acrylate, decyl (meth)acrylate, isodecyl (meth)acrylate, undecyl (meth) acrylate, dodecyl (meth) acrylate, lauryl (meth) acrylate, octadecyl (meth)acrylate, stearyl (meth) acrylate, tetrahydrofurfuryl (meth) acrylate, butoxyethyl (meth) acrylate, ethoxydiethylene glycol (meth)acrylate, benzyl (meth)acrylate, cyclohexyl (meth)acrylate, phenoxyethyl (meth)acrylate, polyethylene glycol mono(meth)acrylate, po lypropylene glycol mono(meth )acrylate, methoxyethylene glycol mono(meth)acrylate, ethoxyethyl (meth)acrylate, ethoxyethoxyethyl (meth)oacrylate, methoxypolyethylene glycol (meth)acrylate, methoxypolypropylene glycol (meth) acrylate, dicyclopentadienyl (meth)acrylate, dicyclopentanyl (meth)acrylate, dicyclopentenyl (meth)acrylate, tricyclodecanyl (meth)acrylate, bornyl (meth)acrylate, isobornyl (meth)acrylate, adamantyl (meth)acrylate, dimethylaminoethyl (meth)acrylate, diethylaminoethyl (meth)acrylate, 7-amino-3,7-dimethyloctyl (meth)acrylate, (meth) acryloylmorpholine, 2-(meth)acryloyloxyethylphthalic acid, 2-(meth)acryloyloxyethylhexahydrophthalic acid, 2-(meth) acryloyloxypropylphthalic acid, 2-(meth) acryloyloxypropyltetrahydrophthalic acid, 2-(meth) acryloyloxypropylhexahydrophthalic acid, 2-(meth) acryloyloxyethylsuccinic acid, trifluoroethyl (meth)acrylate, tetrafluoropropyl (meth)acrylate, hexafluoropropyl (meth) acrylate, octafluoropentyl (meth)acrylate, heptadecafluorodecyl (meth)acrylate, mono[2-(meth)acryloyloxyethyl] phosphate, mono[2-(meth)acryloyloxyethyl] diphenylphosphate, mono[2-(meth)acryloyloxypropyl] phosphate, and compounds represented by the following formulas (3) to (5):

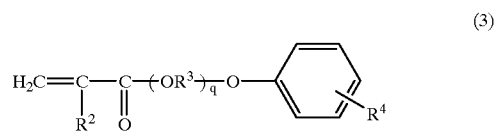

(3)

wherein $R^2$ represents a hydrogen atom or a methyl group, $R^3$ represents an alkylene group or a hydroxyalkylene group having 2–6 carbon atoms, $R^4$ represents a hydrogen atom or an alkyl group having 1–12 carbon atoms, and ?? denotes an integer from 0 to 20, preferably 1–8.

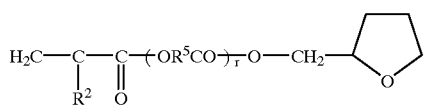

(4)

wherein $R^2$ represents a hydrogen atom or a methyl group, $R^5$ represents an alkylene group having 2–8 carbon atoms, and r denotes an integer from 0 to 8, preferably 1–8 and more preferably 1–4; and

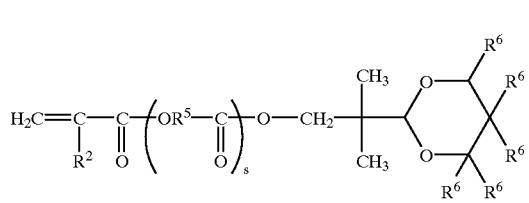

(5)

wherein $R^2$ represents a hydrogen atom or a methyl group, $R^5$ represents an alkylene group having 2–8 carbon atoms, s denotes an integer from 0 to 8, and $R^6$ represent a hydrogen atom or an alkyl group having 1–6 carbon atoms.

These compounds are commercially available under the trade names, for example, Aronix M101, M102, M110, M111, M113, M114, M117, M120, M152, M154, M5300, M5400, M5500, M5600 (manufactured by Toagosei Co., Ltd.), KAYARAD TC-110S, R-128H, R629, R644 (manufactured by Nippon Kayaku Co., Ltd.), IPAA, AIB, SBAA, TBA, IAAA, HEXA, CHA, NOAA, IOAA, INAA, LA, TDA, MSAA, CAA, HDAA, LTA, STA, ISAA-1, ODAA, NDAA, IBXA, ADAA, TCDA, 2-MTA, DMA, Viscoat #150, #150D, #155, #158, #160, #190, #190D, #192, #193, #220, #320, #2311HP, #2000, #2100, #2150, #2180, MTG (manufactured by Osaka Organic Chemical Industry Co., Ltd.), NK Ester M-20G, M-40G, M-90G, M-230G, CB-1, SA, S, AMP-10G, AMP-20G, AMP-60G, AMP-90G, A-SA, NLA (manufactured by Shin-Nakamura Chemical Co., Ltd.), ACMO (manufactured by Kojin Co., Ltd.), Light acrylate IA-A, L-A, S-A, BO-A, EC-A, MTG-A, DPM-A, PO-A, P-200A, THF-A, IB-XA, HOA-MS, HOA-MPL, HOA-MPE, HOA-HH, IO-A, BZ-A, NP-EA, NP-10EA, HOB-A, FA-108, Epoxy Ester M-600A, Light Ester P-M (manufactured by Kyoeisha Chemical Co., Ltd.), FA-511, FA-512A, FA-513A (manufactured by Hitachi Chemical Co., Ltd.), AR-100, MR-100, MR-200, MR-260 (manufactured by Daihachi Chemical Co., Ltd.), and JAMP-100, JAMP-514, JPA-514 (manufactured by Johoku Chemical Co., Ltd.).

Examples of a polyfunctional compound that may be included in the composition as component D include ethylene glycol di(meth)acrylate, propylene glycol di(meth) acrylate, 1,4-butanediol di(meth)acrylate, 1,6-hexanediol di(meth)acrylate, 1,9-nonanediol di(meth)acrylate, diethylene glycol di(meth)acrylate, triethylene glycol di(meth) acrylate, tetraethylene glycol di(meth)acrylate, polyethylene glycol di(meth)acrylate, dipropylene glycol di(meth) acrylate, tripropylene glycol di(meth)acrylate, polypropylene glycol di(meth)acrylate, neopentyl glycol di(meth) acrylate, hydroxypivalic acid neopentyl glycol di(meth) acrylate, trimethylolpropane tri(meth)acrylate, pentaerythritol tri(meth)acrylate, pentaerythritol tetra(meth) acrylate, ditrimethylolpropane tetra(meth)acrylate, dipentaerythritol penta(meth)acrylate, dipentaerythritol hexa (meth)acrylate, trimethylolpropane trioxyethyl(meth) acrylate, trimethylolpropane polyoxyethyl(meth)acrylate, trimethylolpropane trioxypropyl(meth)acrylate, trimethylolpropane polyoxyethyl(meth)acrylate, tris(2-hydroxyethyl) isocyanurate di(meth)acrylate, tris(2-hydroxyethyl) isocyanurate tri(meth)acrylate, ethylene oxide addition bisphenol A di(meth)acrylate, ethylene oxide addition bisphenol F di(meth)acrylate, propylene oxide addition bisphenol A di(meth)acrylate, propylene oxide addition bisphenol F di(meth)acrylate, tricyclodecanedimethanol di(meth)acrylate, bisphenol A diepoxydi(meth)acrylate, bisphenol F diepoxydi(meth)acrylate, bis[2-(meth) acryloyloxyethyl]phosphate, bis[2-(meth) acryloyloxypropyl]phosphate, and tris[2-(meth) acryloyloxyethyl]phosphate.

Examples of commercially available products of the polyfunctional compounds that may be included in the composition as component D include SA-1002, SA-2006, SA-2007, SA-4100, SA-5001, SA-6000, SA-7600, SA-8000, SA-9000 (manufactured by Mitsubishi Chemical Corp.), Viscoat #195, #195D, #214HP, #215, #215D, #230, #230D, #260, #295, #295D, #300, #310HP, #310HG, #312, #335HP, #335D, #360, GPT, #400, V#540, #700, GPT (manufactured by Osaka Organic Chemical Industry Co., Ltd.), KAYARAD MANDA, R-526, NPGDA, PEG400DA, R-167, HX-220, HX-620, R-551, R-712, R-604, R-684, GPO-303, TMPTA, THE-330, TPA-320, TPA-330, PET-30, RP-1040, T-1420, DPHA, D-310, D-330, DPCA-20, DPCA-30, DPCA-60, DPCA-120 (manufactured by Nippon Kayaku Co., Ltd.), Aronix M210, M208, M215, M220, M225, M233, M240, M245, M260, M270, M305, M309, M310, M315, M-320, M-350, M-360, M-400, M-408, M-450 (manufactured by Toagosei Co., Ltd.), SR-212, SR-213, SR-355 (manufactured by Sartomer Co., Ltd.), SP-1506, SP-1507, SP-1509, SP-1519-1, SP-1563, SP-2500, VR60, VR77, VR90 (manufactured by Showa Highpolymer Co., Ltd.), Light Ester P-2M (manufactured by Kyoeisha Chemical Co., Ltd.), Viscoat 3PA (manufactured by Osaka Organic Chemical Industry Co., Ltd.), and EB-169, EB-179, EB-3603, R-DX63182 (manufactured by Daicel UCB Co., Ltd.). The component (D) is used to provide the composition with a desired range of viscosity, Tg, refractive index, and the like. The component (D) is preferably used in an amount of 0–70% by weight, more preferably 5–60% by weight and most preferably 20 to 50% by weight for the total weight of the components A, B, C, D and E.

In addition to the above components (A), (B), and (C), radically polymerizable compounds other than compounds containing an acrylate group may be incorporated in the composition of the present invention as component (E). Examples of such compounds include N-vinylpyrrolidone, N-vinylcaprolactam, vinyl acetate, vinyl propionate, styrene, alkylacrylamides, divinylbenzene, and unsaturated polyesters. However, N-vinyl-pyrrolidone preferably is not used. The unsaturated polyester preferably is an ester of a dicarboxylic acid containing a radically polymerizable unsaturated double bond and an alcohol. Examples of a dicarboxylic acid containing a radically polymerizable unsaturated double bond include maleic acid, maleic anhydride, itaconic acid, and fumaric acid. Examples of an alcohol include monohydric alcohols such as methanol, ethanol, n-propyl alcohol, isopropyl alcohol, n-butyl alcohol, isobutyl alcohol, sec-butyl alcohol, tert-butyl alcohol, n-hexanol, cyclohexanol, and 2-ethylhexyl alcohol; (poly)ethylene glycols such as ethylene glycol, diethylene glycol, triethylene glycol, and the like; (poly)propylene glycols such as propylene glycol, dipropylene glycol, and tripropylene glycol; dihydric alcohols such as 1,6-hexanediol; and trihydric alcohols such as glycerol and trimethylolpropane.

Furthermore, an epoxy resin, polyamide, polyamideimide, polyurethane, polybutadiene, chloroprene, polyether, polyester, pentadiene derivatives, SBS (styrene/butadiene/styrene block copolymer), hydrogenated products of SBS, SIS (styrene/isoprene/styrene block copolymer), petroleum resin, xylene resin, ketone resin, fluorine-based oligomer, silicone-based oligomer, polysulfide-based oligomer, and the like may be incorporated in the composition of the present invention as other additives.

The component (E), as noted above, need not be included in the composition of the present invention. However, when component (E) is included, it is generally included in the uncured composition in an amount of less than 60 parts by weight, and desirably from about 1 to 30 parts by weight of the total weight of the components (A), (B), (C), (D) and (E).

The composition of the present invention may further include various paint additives other than the above additives, for example, antioxidants, UV absorbers, light stabilizers, aging preventives, silane coupling agents, antifoaming agents, leveling agents, antistatic agents, surfactants, preservatives, heat polymerization inhibitors, plasticizers, and wettability improvers. Examples of antioxidants include Irganox 245, 259, 565, 1010, 1035, 1076, 1081, 1098, 1222, 1330 (manufactured by Ciba Specialty Chemicals Co., Ltd.), and the like.

Examples of UV absorbers include benzotriazole type and triazine type UV absorbers and commercially available products such as Tinuvin P, 234, 320, 326, 327, 328, 213, 400 (manufactured by Ciba Specialty Chemicals Co., Ltd.), Sumisorb 110, 130, 140, 220, 250, 300, 320, 340, 350, 400 (manufactured by Sumitomo Chemical Industries Co., Ltd.), and the like.

Examples of light stabilizers include commercially available products such as Tinuvin 144, 292, 622LD (manufactured by Ciba Specialty Chemicals Co., Ltd.), Sanol LS440, LS770 (manufactured by Sankyo Co., Ltd.), and Sumisorb TM-061 (manufactured by Sumitomo Chemical Industries Co., Ltd.). Light stabilizers are added in the amount of 5 parts by weight or less of 100 parts by weight of the composition of the present invention.

Examples of aging preventives include phenol type, allylamine type, and ketone amine type aging preventives. Examples of commercially available products of these aging preventives include Antigene W, S, P, 3C, 6C, RD-G, FR, and AW (manufactured by Sumitomo Chemical Industries Co., Ltd.).

A preferred additive is a silane coupling agent.

Examples of silane coupling agents include:
γ-mercaptopropylmethylmonomethoxysilane,
γ-mercaptopropylmethyldimethoxysilane,
γ-mercaptopropyltrimethoxysilane,
γ-mercaptopropylmonoethoxysilane,
γ-mercaptopropyldiethoxysilane,
γ-mercaptopropyltriethoxysilane,
β-mercaptoethylmonoethoxysilane,
β-mercaptoethyltriethoxysilane,
β-mercaptoethyltriethoxysilane, N-(2-aminoethyl)-3-aminopropylmethyldimethoxysilane, N-(2-aminoethyl)-3-aminopropyltrimethoxysilane,
γ-aminopropyltriethoxysilane,
γ-glycidoxylpropyltrimethoxysilane, γ-glycidoxylpropylmethyldimethoxysilane, 2-(3,4-epoxycyclohexyl)ethyltrimethoxysilane,
γ-chloropropylmethyldimethoxysilane,
γ-chloropropyltrimethoxysilane, and
γ-methacryloyloxypropyltrimethoxysilane. Examples of commercially available products of these compounds include SILAACE S310, S311, S320, S321, S330, S510, S520, S530, S610, S620, S710, S810 (manufactured by Chisso Corp.), SH6062, AY43-062, SH6020, SZ6023, SZ6030, SH6040, SH6076, SZ6083 (manufactured by Toray-Dow Corning Silicone Co., Ltd.), KBM403, KBM503, KBM602, KBM603, KBM803, KBE903 (manufactured by Shin-Etsu Silicone Co., Ltd.), and the like. The silane coupling agent is preferably included in the uncured adhesive in an amount of from 0.2 to 5 wt % based on the total weight of compounds (A), (B), (C), (D) and (E) in the uncured adhesive.

Examples of antifoaming agents include organic copolymers excluding silicon and fluorine which are commercially available under the trade names, for example, Fluorene AC-202, AC-300, AC-303, AC-326F, AC-900, AC-1190, and AC-2000 (manufactured by Kyoeisha Yushi Co., Ltd.); silicon-containing antifoaming agents which are commercially available under the trade names, for example, Fluorene AC-901, AC-950, AC-1140, AO-3, AO-4OH (manufactured by Kyoeisha Yushi Co., Ltd.), FS1265, SH200, SH5500, SC5540, SC5570, F-1, and SD5590 (manufactured by Toray-Dow Corning Silicone Co., Ltd.); fluorine-containing antifoaming agents which are commercially available under the trade names, for example, MEGAFAC F-142D, F-144D, F-178K, F-179, F-815 (manufactured by Dainippon Ink and Chemicals, Inc.); and the like.

Examples of leveling agents include Polyflow No. 7, No. 38, No. 50E, S, 75, No. 75, No. 77, No. 90, No. 95, No. 300, No. 460, ATF, KL-245 (manufactured by Kyoeisha Yushi Co., Ltd.), and the like.

The amount of these additives can be appropriately determined so that the object of the present invention is not adversely affected.

The viscosity of the composition of the present invention is preferably from 10 to 10000 mPa·s, more preferably from 50 to 5000 mPa·s, and even more preferably from 100 to 2000 mPa·s.

These components are incorporated so that the glass transition temperature of the resulting cured product is usually from −50 to 200° C., preferably from −30 to 200° C., and more preferably from 0 to 120° C. If the glass transition temperature is too low, the cured products may soften when heated in summer or in a closed and sunny room, thereby resulting in the decreased adhesion strength. This may cause the adhered members to peel off or slip out. On the contrary, if the glass transition temperature is too high, adhesion may be insufficient or the coated members break when dropped or bent.

The glass transition temperature described here is defined as the temperature at which a loss tangent (tan d) reaches a peak when measured by a dynamic viscoelasticity measuring device at an oscillation frequency of 10 Hz.

The composition of the present invention can be cured by exposure to ultraviolet radiation, visible rays, electron beams, and the like in the same manner as in the case of using conventional photocurable resin compositions. The composition of the present invention can be easily cured by filling the composition between the members to be coated so that the thickness of the adhesive layer is from 10 to 100 $\mu$m and irradiating the adhesive layer at a dose of 50 to 2000 mJ/cm$^2$ using a metal halide lamp, whereby the members can be glued to each other.

Further, the cured products made from the composition of the present invention are desired to have excellent transparency. For example, it is preferable that the cured products with a thickness of 60 μm have a light transmittance of 90% or more at a wave length of 600 to 700 nm. If the light transmittance is less than 90%, not only is the appearance of the optical disks impaired, but also the light for reading the information recorded on the disk is reduced by the adhesive layer, thereby making it difficult to read the information. Therefore, in preparing the composition of the present invention, each component should be blended so that the light transmittance of the resulting cured product satisfy this requirement.

In addition, it is desirable to blend each component so that the refractive index of the photocured product made from the composition of the present invention is in the range from 1.4 to 1.7, and preferably from 1.51 to 1.70 at 25° C. If the refractive index is out of this range, reading of the information recorded on the disk may be difficult.

The composition of the present invention exhibits excellent adhesion to plastics such as polycarbonate (PC) and methyl polymethacrylate (PMMA), metals such as gold and aluminum, and inorganic materials such as glass. Therefore, the composition of the present invention is suitable as an adhesive for optical disks.

EXAMPLES

The present invention will be explained in more detail by way of examples, which are not intended to be limiting of the present invention.

Synthesis of Urethane Acrylate as Component (A)

Synthesis Example 1

209 g of isophorone diisocyanate, 0.2 g of 3,5-di-t-butyl-4-hydroxytoluene, and 0.8 g of di-n-butyltin dilaurate were placed in a separable flask (1 liter) equipped with a stirrer and a thermometer. The mixture was stirred and then cooled to 10° C. in a cold water bath in dry air. 109 g of 2-hydroxyethyl acrylate was gradually added to the mixture and reacted for one hour while maintaining the temperature at 10 to 35° C. Then, 480 g of polytetramethylene glycol having a hydroxyl value of 109.7 mg KOH/g (trade name: PTMG1000, manufactured by Mitsubishi Chemical Corp.) was added and the resulting mixture was stirred at 40 to 60° C. for 5 hours to react, thus obtaining urethane acrylate (A1) having a number average molecular weight of 1650.

Synthesis Example 2

Urethane acrylate (A2) having a number average molecular weight of 1530 was prepared in the same manner as in Synthetic Example 1, except for using 472 g of polyester diol having a hydroxyl value of 111.7 mg KOH/g (trade name: Kurapol P1010, manufactured by Kuraray Co., Ltd.) instead of the polytetramethylene glycol used in Synthetic Example 1.

Synthesis Example 3

Urethane acrylate (A3) having a number average molecular weight of 2570 was prepared in the same manner as in Synthetic Example 1, except for using 956 g of polyether diol having a hydroxyl value of 55.2 mg KOH/g (trade name: PTG-L 2000, manufactured by Hodogaya Chemical Co., Ltd.) instead of the polytetramethylene glycol used in Synthesis Example 1.

Examples and Comparative Examples

Preparation of Compositions for Forming Radiation Curable Coating Films

The components shown in Table 1 were placed in a reaction vessel equipped with a stirrer and stirred to prepare the compositions of Examples 1–3 and Comparative Examples 1–4. The components shown in Table 1 are as follows. The amount of each component is indicated by parts by weight in Table 1.

Component (B)
B1: 4-Hydroxybutyl acrylate (4HBA, manufactured by Osaka Organic Chemical Industry Co., Ltd.)
B2: 4-hydroxycyclohexyl acrylate (4HCHA)

Component (C)
C1-1: 2,2-Dimethoxy-1,2-diphenylethan-1-on (Irgacure 651, manufactured by Ciba Specialty Chemicals Co., Ltd.)
C1-2: 2-Hydroxy-2-methyl-1-phenyl-propan-1-on (Darocur 1173, manufactured by Ciba Specialty Chemicals Co., Ltd.)
C2-1: 2-Benzyl-2-dimethylamino-1-(4-morpholinophenyl)-butan-1-one (Irgacure 369, manufactured by Ciba Specialty Chemicals Co., Ltd.)
C2-2: 2-Methyl-1[4-(methylthio)phenyl-2-morpholino-propan-1-one (Irgacure 907, manufactured by Ciba Specialty Chemicals Co., Ltd.)
C2-3: 2,4,6-trimethylbenzoyldiphenylphosphine oxide (Lucirin TPO, manufactured by BASF)

Component (D)
D1: Hydroxypivalic acid neopentyl glycol diacrylate (KAYARAD MANDA, manufactured by Nippon Kayaku Co., Ltd.)
D2: Phenoxyethyl acrylate (Viscoat 192, manufactured by Osaka Organic Chemical Industry Co., Ltd.)
D3: Lauryl acrylate (LA, manufactured by Osaka Organic Chemical Industry Co., Ltd.)
D4: Isobornyl acrylate (IBXA, manufactured by Osaka Organic Chemical Industry Co., Ltd.)
D5: 2-Acryloyloxypropyl hydrogen phthalate (Viscoat 2100, manufactured by Osaka Organic Chemical Industry Co., Ltd.)
D6: Nonylphenol EO-modified acrylate (M111, manufactured by Toagosei Co., Ltd.)
D7: Ethoxylated trimethylolpropane triacrylate (A-TMPT-3EO, manufactured by Shin-Nakamura Chemical Co., Ltd.)

Adhesion to substrates and wet heat resistance of the compositions prepared above (Examples 1–3 and Comparative Examples 1–4) were measured according to the following methods.

(1) Adhesion to Substrates

Adhesion to a Polycarbonate Substrate:

The composition was applied on a PC substrate (Panlite, manufactured by Teijin Chemicals Ltd.) using a spin coater. The coating was irradiated with light at a dose of 100 mJ/cm2 in a nitrogen atmosphere to form a cured coating with a thickness of 50 mm. The cured coating was then subjected to the cross-cut cellophane tape peeling test. Specifically, 1 cm notches crossing at the center of the cured coating at almost a right angle were cut using a cutter knife. A cellophane tape was applied to the cured coating and then rapidly peeled off. When the cured coating peeled off in the cellophane tape peeling test, the adhesion was determined to be bad, which is indicated by "X" in Table 1. When the cured coating did not peel off, the adhesion was determined to be good, which is indicated by "O" in Table 1.

Adhesion to Aluminum:

The composition was applied on an aluminum coating formed by vapor deposition using a sputtering method on the same PC substrate as that used in the above test using a spin coater. The coating was irradiated with light at a dose of 100 mJ/cm2 in a nitrogen atmosphere to form a cured coating with a thickness of 50 mm. The cured coating was then subjected to the cross-cut cellophane tape peeling test in the same manner as in the case of the above PC substrate. When part or all of the aluminum coating peeled off from the PC substrate, the adhesion of the cured coating was determined to be good, which is indicated by "O" in Table 1. When the aluminum coating did not peel off at all, the adhesion was determined to be bad, which is indicated by "X" as shown in Table 1.

Adhesion to Gold:

The composition was applied on a gold coating formed by vapor deposition using a sputtering method on the same PC substrate as that used in the above test using a spin coater. The coating was irradiated with light at a dose of 100 mJ/cm2 in a nitrogen atmosphere to form a cured coating with a thickness of 50 mm. The cured coating was then subjected to the cross-cut cellophane tape peeling test in the same manner as in the case of the above PC substrate. When part or all of the gold coating peeled off from the PC substrate, the adhesion was determined to be good, which is indicated by "O" in Table 1. When the gold coating did not peel off at all, the adhesion was determined to be bad, which is indicated by "X" in Table 1.

(2) Wet Heat Resistance

A combination "1" of (a) a substrate formed by applying an aluminum coating on the PC substrate by sputtering and (b) a PC substrate and a combination "2" of (a) a substrate formed by applying an aluminum coating on the PC substrate by sputtering and (c) a substrate formed by applying a gold coating on the PC substrate by sputtering were provided. The two substrates in each combination "1" or "2" were attached by producing a coating with a thickness of about 50 mm using a spin coater. The combined substrates "1" and "2" were irradiated with light at a dose of 500 mJ/cm2 from the side of the PC substrate (b) or the substrate formed by applying a gold coating on a PC substrate (c), to adhere a pair of substrates (a) and (b) or (a) and (c). The adhered substrates were then allowed to stand at 800° C. and 95% relative humidity (RH) for 96 hours in a thermo-hygrostat. When any abnormalities such as bubbles and corrosion were observed on the adhesive layer or in the interface between the adhesive layer and the substrate, the wet heat resistance was determined to be bad, which is indicated by "X" in Table 1. When no such abnormalities were observed, the wet heat resistance was determined to be good, which is indicated by "O" in Table 1.

The composition of Example 1 comprising the components (A), (B), (C) and (D) exhibits superior adhesion properties including PC, Al, and Au adhesion and has excellent wet heat resistance. The composition of Example 2, which does not contain the components (D) but a large amount of the component (B), exhibited especially excellent wet heat resistance. The composition of Example 3, the composition according to claim 3 which does not include the component (C-2), showed satisfactory results in all evaluation items. On the other hand, the wet heat resistance was poor in the composition of Comparative Examples 1, 2 and 3 which do not contain the component (B). Comparative Examples 2 showed inferior Al and Au adhesion.

TABLE 1

| Component | Example 1 | Example 2 | Example 3 | Comparative Example 1 | Comparative Example 2 | Comparative Example 3 |
|---|---|---|---|---|---|---|
| A1 | 30 | | | 30 | | |
| A2 | | 50 | | | 30 | |
| A3 | | | 30 | 30 | | |
| B1 | 30 | 70 | | | | |
| B2 | | | 20 | | | |
| C1-1 | 2 | | 3 | | | |
| C1-2 | | 4 | 2 | 2 | | |
| C2-1 | | | | 2 | | |
| C2-2 | 2 | | | | 2 | 2 |
| C2-3 | | | | 2 | | 2 |
| D1 | | | 15 | | | 35 |
| D2 | 20 | | | | | |
| D3 | 20 | | | 35 | | |
| D4 | | | | | 35 | |
| D5 | | | 15 | | | |
| D6 | | | | 35 | | 35 |
| D7 | | | | | 35 | |
| Adhesion to PC | O | O | O | O | O | O |
| Adheston to Al | O | O | O | O | X | O |
| Adhesion to Au | O | O | O | O | X | O |
| Wet heat resistance | O | O | O | X | X | X |

Example 4

The components shown in Table 2 were placed in a reaction vessel equipped with a stirrer and stirred to prepare the composition.

TABLE 2

| Composition | Parts by wt. |
|---|---|
| Oligomer[1] | 33 |
| VR 77[2] | 15 |
| 4-HB | 30 |
| 4 EGA[3] | 22 |
| Irgacure 651 | 3 |
| Darocure 1173 | 3 |
| Kayacure EPA | 0.5 |
| Irganox 1035 | 0.3 |
| SH 6062[4] | 1.0 |

[1]The idealized structure for the oligomer is H-I-PTGL 2000-I-H wherein H is hydroxyethylacrylate, I is isophoronediisocyanate, and PTGL 2000 is a copolymer of tertrahydrofuran and methyltetrahydrofuran (The oligomer is available from Hodogaya in Japan.)
[2]is bisphenol-A-epoxy acrylate.
[3]is tetraethyleneglycol diacrylate.
[4]is γ-mercapto propyl trimethoxy silane.

The adhesives were applied on optical disks or in the wet heat resistance test described above. Excellent results are obtained with the composition described in Table 2.

The adhesive composition of the present invention not only cures fast, has a high light transmittance, exhibits superior adhesion to resins, reflecting films, translucent films, and the like for forming optical disks, but also possesses superior wet heat resistance. The adhesive is extremely useful for manufacturing optical disks as compared to conventional adhesives.

We claim:

1. An adhesive for optical disks comprising components (A), (B), and (C), wherein:
   component A is a urethane acrylate or methacrylate comprising a backbone, urethane groups and an acrylate or a methacrylate group,
   component B is an hydroxy acrylate or methacrylate wherein the hydroxyl group and said acrylate or methacrylate group are separated by at least 3 carbons, component C comprises at least one photoinitiator,
said adhesive composition containing hydroxyl groups in an amount of at least 0.3 meq/g.

2. The adhesive according to claim 1, wherein component (B) is a hydroxyalkyl acrylate or methacrylate wherein the hydroxyl group is present on the γ, δ or ε position with respect to the acrylate or methacrylate.

3. The adhesive according to claim 1, wherein the component (B) is 4-hydroxybutyl acrylate or 4-hydroxybutyl methacrylate.

4. The adhesive according to any one of claims 1–3, further comprising:
a mono-functional or poly-functional acrylate or a mono-functional or poly-functional methacrylate other than component (A) or component (B).

5. The adhesive according to any one of claims 1–3 further comprising:
a radically polymerizable compound other than compounds comprising acrylate or methacrylate groups.

6. The adhesive according to claim 4 further comprising:
a radically polymerizable compound other than compounds comprising acrylate or methacrylate groups.

7. The adhesive according to any one of claims 1–3, wherein component (C) comprises at least one compound selected from the group consisting of 2,2-dimethoxy-1,2-diphenylethan-1-one, 2-hydroxy-2-methyl-1-phenyl-propan-1-one, and 1-hydroxy-cyclokexylphenylketone.

8. The adhesive according to claim 4, wherein component (C) comprises at least one compound selected from the group consisting of 2,2-dimethoxy-1,2-diphenylethan-1-one, 2-hydroxy-2-methyl-1-phenyl-propan-1-one, and 1-hydroxy-cyclokexylphenylketone.

9. The adhesive according to claim 5, wherein component (C) comprises at least one compound selected from the group consisting of 2,2-dimethoxy-1,2-diphenylethan-1-one, 2-hydroxy-2-methyl-1-phenyl-propan-1-one, and 1-hydroxy-cyclokexylphenylketone.

10. The adhesive according to claim 6, wherein component (C) comprises at least one compound selected from the group consisting of 2,2-dimethoxy-1,2-diphenylethan-1-one, 2-hydroxy-2-methyl-1-phenyl-propan-1-one, and 1-hydroxy-cyclokexylphenylketone.

11. The adhesive composition according to any one of claims 1–3, wherein the composition has a viscosity of 100–2000 mPa's.

12. The adhesive composition according to claim 4, wherein the composition has a viscosity of 100–2000 mPa's.

13. The adhesive composition according to claim 5, wherein the composition has a viscosity of 100–2000 mPa's.

14. The adhesive composition according to claim 6, wherein the composition has a viscosity of 100–2000 mPa's.

15. The adhesive composition according to claim 7, wherein the composition has a viscosity of 100–2000 mPa's.

16. The adhesive composition according to claim 8, wherein the composition has a viscosity of 100–2000 mPa's.

17. The adhesive composition according to claim 9, wherein the composition has a viscosity of 100–2000 mPa's.

18. The adhesive composition according to claim 10, wherein the composition has a viscosity of 100–2000 nPa's.

19. The adhesive composition according to any one of claims 1–3, wherein said adhesive composition contains hydroxyl groups in an amount of from about 0.3 meq/g to 4 meq/g.

20. The adhesive according to claim 4, wherein said adhesive composition contains hydroxyl groups in an amount of from about 0.3 meq/g to 4 meq/g.

21. The adhesive according to claim 5, wherein said adhesive composition contains hydroxyl groups in an amount of from about 0.3 meq/g to 4 meq/g.

22. The adhesive according to claim 6, wherein said adhesive composition contains hydroxyl groups in an amount of from about 0.3 meq/g to 4 meq/g.

23. The adhesive according to claim 7, wherein said adhesive composition contains hydroxyl groups in an amount of from about 0.3 meq/g to 4 meq/g.

24. The adhesive according to claim 8, wherein said adhesive composition contains hydroxyl groups in an amount of from about 0.3 meq/g to 4 meq/g.

25. The adhesive according to claim 9, wherein said adhesive composition contains hydroxyl groups in an amount of from about 0.3 meq/g to 4 meq/g.

26. The adhesive according to claim 10, wherein said adhesive composition contains hydroxyl groups in an amount of from about 0.3 meq/g to 4 meq/g.

27. An optical disk comprising a first substrate, a second substrate and an adhesive therebetween, for adhering said substrates, wherein said adhesive, in uncured form, is an adhesive according to any one of claims 1–3.

28. An optical disk comprising a first substrate, a second substrate and an adhesive therebetween, for adhering said substrates, wherein said adhesive, in uncured form, is an adhesive according to claim 4.

29. An optical disk comprising a first substrate, a second substrate and an adhesive therebetween, for adhering said substrates, wherein said adhesive, in uncured form, is an adhesive according to claim 5.

30. An optical disk comprising a first substrate, a second substrate and an adhesive therebetween, for adhering said substrates, wherein said adhesive, in uncured form, is an adhesive according to claim 6.

31. The optical disk according to claim 27, wherein the cured product obtained by irradiation of said adhesive with UV light has a glass transition temperature from 0 to 120° C.

32. The optical disk according to claim 28, wherein the cured product obtained by irradiation of said adhesive with UV light has a glass transition temperature from 0 to 120° C.

33. The optical disk according to claim 29, wherein the cured product obtained by irradiation of said adhesive with UV light has a glass transition temperature from 0 to 120° C.

34. The optical disk according to claim 30, wherein the cured product obtained by irradiation of said adhesive with UV light has a glass transition temperature from 0 to 120° C.

35. The optical disk according to claim 27, wherein the cured product obtained by irradiation of said adhesive with UV light has a refractive index from 1.4 to 1.7.

36. The optical disk according to claim 28, wherein the cured product obtained by irradiation of said adhesive with UV light has a refractive index from 1.4 to 1.7.

37. The optical disk according to claim 29, wherein the cured product obtained by irradiation of said adhesive with UV light has a refractive index from 1.4 to 1.7.

38. The optical disk according to claim 30, wherein the cured product obtained by irradiation of said adhesive with UV light has a refractive index from 1.4 to 1.7.

39. An optical disk comprising a first substrate, a second substrate and an adhesive therebetween, for adhering said substrates, wherein said adhesive, in uncured form is an adhesive according to claim 7.

40. An optical disk comprising a first substrate, a second substrate and an adhesive therebetween, for adhering said substrates, wherein said adhesive, in uncured form is an adhesive according to claim 8.

41. An optical disk comprising a first substrate, a second substrate and an adhesive therebetween, for adhering said substrates, wherein said adhesive, in uncured form is an adhesive according to claim 9.

42. An optical disk comprising a first substrate, a second substrate and an adhesive therebetween, for adhering said substrates, wherein said adhesive, in uncured form is an adhesive according to claim 10.

43. An optical disk according to claim 42, wherein the cured product obtained by irradiation of said adhesive with UV light has a glass transition temperature from 0 to 120° C.

44. An optical disk according to claim 42, wherein the cured product obtained by irradiation of said adhesive with UV light has a refractive index from 1.4 to 1.7.

45. The optical disk according to claim 39, wherein the cured product obtained by irradiation of said adhesive with UV light has a glass transition temperature from 0 to 120° C.

46. The optical disk according to claim 40, wherein the cured product obtained by irradiation of said adhesive with UV light has a glass transition temperature from 0 to 120° C.

47. The optical disk according to claim 41, wherein the cured product obtained by irradiation of said adhesive with UV light has a glass transition temperature from 0 to 120° C.

48. The optical disk according to claim 39, wherein the cured product obtained by irradiation of said adhesive with UV light has a refractive index from 1.4 to 1.7.

49. The optical disk according to claim 40, wherein the cured product obtained by irradiation of said adhesive with UV light has a refractive index from 1.4 to 1.7.

50. The optical disk according to claim 41, wherein the cured product obtained by irradiation of said adhesive with UV light has a refractive index from 1.4 to 1.7.

* * * * *